(12) United States Patent
Fujiwara

(10) Patent No.: US 11,495,032 B2
(45) Date of Patent: Nov. 8, 2022

(54) SENSING APPARATUS

(71) Applicant: TOYOTA JIDOSHA KABUSHIKI KAISHA, Toyota (JP)

(72) Inventor: Yusuke Fujiwara, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 290 days.

(21) Appl. No.: 16/569,919

(22) Filed: Sep. 13, 2019

(65) Prior Publication Data

US 2020/0097745 A1 Mar. 26, 2020

(30) Foreign Application Priority Data

Sep. 20, 2018 (JP) .............................. JP2018-175704

(51) Int. Cl.
*G06V 20/59* (2022.01)
*G06V 40/10* (2022.01)
*G06V 40/70* (2022.01)

(52) U.S. Cl.
CPC ............ *G06V 20/597* (2022.01); *G06V 40/10* (2022.01); *G06V 40/70* (2022.01); *G06V 2201/07* (2022.01)

(58) Field of Classification Search
None
See application file for complete search history.

(56) References Cited

U.S. PATENT DOCUMENTS

| 4,736,774 | A | 4/1988 | Vonasek | |
|---|---|---|---|---|
| 9,847,004 | B1* | 12/2017 | Lan | ..................... G08B 21/22 |
| 2016/0345907 | A1* | 12/2016 | Fung | ................. G06K 9/00536 |
| 2017/0039835 | A1* | 2/2017 | Brankovic | ........... H01Q 1/2283 |

FOREIGN PATENT DOCUMENTS

| JP | S63-69655 A | 3/1988 |
|---|---|---|
| JP | S63-69655 U | 5/1988 |
| JP | H11-326084 A | 11/1999 |
| JP | 2007-245908 A | 9/2007 |
| JP | 2008-120289 A | 5/2008 |
| WO | 2014/192636 A1 | 12/2014 |

* cited by examiner

*Primary Examiner* — Leon Viet Q Nguyen
(74) *Attorney, Agent, or Firm* — Oliff PLC

(57) ABSTRACT

A sensing apparatus is configured to measure a target person without being attached to the target person, and is configured to generate information associated with the target person from outputs of at least a part of sensors of a plurality of sensors that are different from each other in at least one of a sensor type and location. The sensing apparatus is provided with: a specifier configured to specify at least one of clothes and physical features of the target person from images obtained by imaging the target person; and a determinator configured to determine one or a plurality of sensors, which are the at least the part of sensors, from the plurality of sensors, on the basis of the specified at least one of the clothes and the physical features.

7 Claims, 2 Drawing Sheets

SENSING APPARATUS

CROSS-REFERENCE TO RELATED APPLICATIONS

This application is based upon and claims the benefit of priority of the prior Japanese Patent Application No. 2018-175704, filed on Sep. 20, 2018, the entire contents of which are incorporated herein by reference.

BACKGROUND

1. Technical Field

Embodiments of the present disclosure relate to a sensing apparatus.

2. Description of the Related Art

For this type of apparatus, there is proposed an apparatus configured to detect at least one of an arousal level (or an awakening degree) and a fatigue level as a driver's state, for example, from a change in a body pressure distribution over time, which is based on output signals of pressure sensors arranged in matrix on a seating surface and a back surfaces of a seat of a vehicle (refer to Japanese Patent Application Laid Open No. H11-326084 (Patent Literature 1)). There are other related technologies described in Japanese Patent Application Laid Open No. 2008-120289 (Patent Literature 2), Japanese Patent Application Laid Open No. 2007-245908 (Patent Literature 3), and Japanese Utility Model Application Laid Open No. S63-069655 (Patent Literature 4).

In a technology/technique described in the Patent Literature 1, drivers' individual differences, such as drivers' physical features, are not considered. Here, the output signals of the pressure sensors described in the Patent Literature 1 also vary depending on the drivers' individual differences. Thus, the technology/technique described in the Patent Literature 1 has such a technical problem that the driver's state may be erroneously detected.

SUMMARY

In view of the aforementioned problem, it is therefore an object of embodiments of the present disclosure to provide a sensing apparatus that can suppress an influence of individual differences.

The above object of embodiments of the present disclosure can be achieved by a sensing apparatus configured to measure a target person without being attached to the target person, and configured to generate information associated with the target person from outputs of at least a part of sensors a plurality of sensors that are different from each other in at least one of a sensor type and location, the sensing apparatus provided with: a specifier configured to specify at least one of clothes and physical features of the target person from images obtained by imaging the target person; and a determinator configured to determine one or a plurality of sensors, which are the at least the part of sensors, from the plurality of sensors, on the basis of the specified at least one of the clothes and the physical features.

DETAILED DESCRIPTION OF THE EMBODIMENT

A sensing apparatus according to an embodiment of the present disclosure will be explained with reference to FIG. 1 to FIG. 3. The embodiment below exemplifies that the sensing apparatus is mounted on a vehicle.

(Configuration)

A configuration of the sensing apparatus according the embodiment will be explained with reference to FIG. 1. FIG. 1 is a block diagram illustrating the configuration of the sensing apparatus according to the embodiment.

Figure 1:
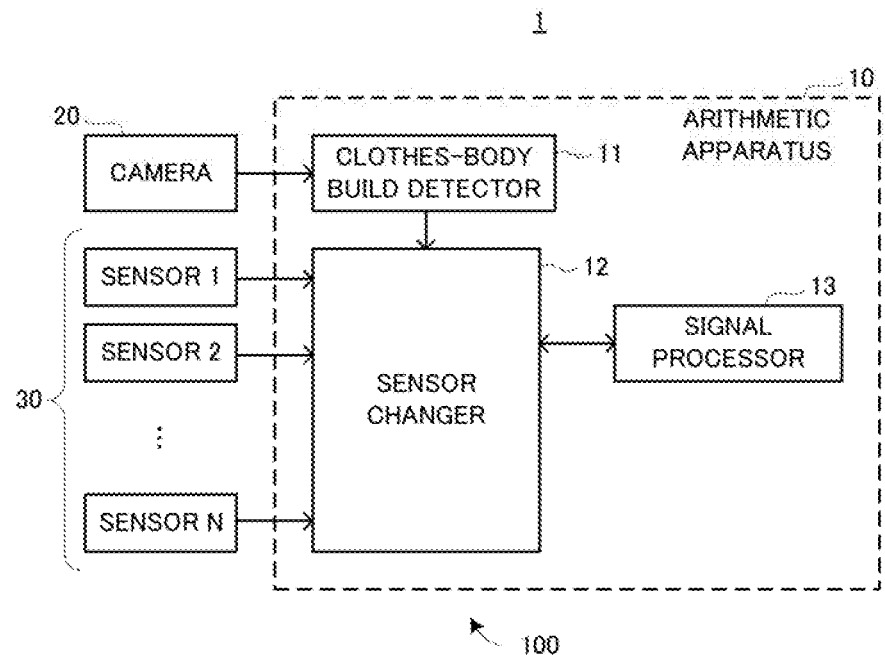
FIG. 1 is a block diagram illustrating a configuration of a sensing apparatus according to an embodiment.

In FIG. 1, a sensing apparatus 100 is mounted on a vehicle 1. In the embodiment, the sensing apparatus 100 is configured to generate information associated with a driver of the vehicle 1 (hereinafter referred to as "driver information" as occasion demands). The "driver information" may typically mean information indicating an index in which a change appears in a relatively short period (e.g., in several seconds to several hours), such as, for example, bio-information, like heartbeat, body temperature, blood pressure or the like, information indicating a body condition, like a fatigue level, and information indicating a psychological (mental) state, like a tension level, a stress level, an arousal level or the like. The "driver information" may mean information indicating an index in which a change requires a relatively long time, such as, for example, height.

The sensing apparatus 100 is provided with an arithmetic apparatus 10, a camera 20 configured to image the driver, and a plurality of sensors 30 configured to measure the driver. The plurality of sensors 30 may be different from each other in at least one of a sensor type and location. The measurement of the driver by each of the plurality of sensors 30 may be performed, directly or indirectly. Here, in particular, each of the plurality of sensors 30 is configured to measure a phenomenon caused by a living body so that the sensing apparatus can generate the driver information. The "phenomenon caused by the living body" may mean a phenomenon related directly to or indirectly to biological activity, such as, for example, a sound and vibration caused by the beating of the heart and a blood flow, biological surface temperature, infrared light caused by a heat of the living body, movement of a biological surface, and an up and down movement of a chest caused by breathing (or respiratory movement).

Figure 2A:
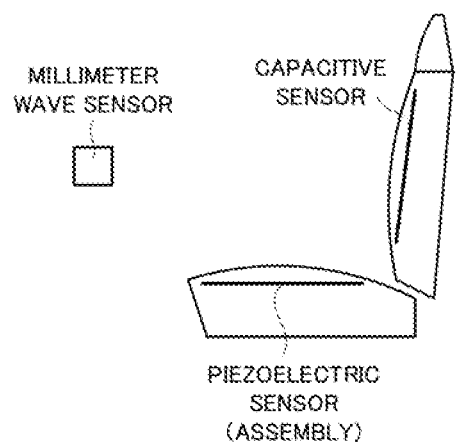
FIG. 2A and FIG. 2B are diagrams illustrating a sensor.
Figure 2B:
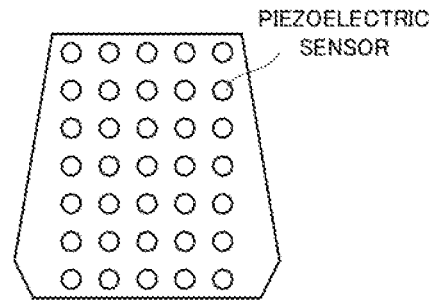

The plurality of sensors 30 may include, for example, a plurality of piezoelectric sensors arranged in an array on a seating surface of a seat on which the driver is seated (refer to FIG. 2A and FIG. 2B), a capacitive sensor placed in a backrest of the seat on which the driver is seated (refer to FIG. 2A), a millimeter wave sensor, or the like. The millimeter wave sensor may be placed, for example, in the vicinity of a steering wheel of the vehicle 1, so that the front of the driver is irradiated with a millimeter wave. FIG. 2 illustrates only one capacitive sensor and one millimeter wave sensor, but a plurality of capacitive sensors and a plurality of millimeter wave sensor may be also provided.

The arithmetic apparatus 10 is provided with a cloths-body build detector 11, a sensor changer 12, and a signal processor 13, as processing blocks logically realized or processing circuits physically realized therein.

The cloths-body build detector 11 is configured to detect clothes and physical features of the driver from images of the driver imaged by the camera 20. To detect the clothes, the existing technologies/techniques can be applied, such as, for example, pattern matching processing for a shape of the clothes. The physical features may include, for example, sex and body build (sitting height, body width, etc.). To detect body build, the existing technologies/techniques can be applied, such as, for example, a method of obtaining the body build of the driver on the basis of the number of pixels that constitute a driver part in an image by using a known width of the seat on which the driver is seated, and a method of obtaining the body build of the driver on the basis of how a mark for measurement looks in an image, wherein the mark for measurement is set in advance on the surface of the backrest of the seat. To detect sex, the existing technologies/techniques can be also applied.

The signal processor 13 is configured to generate the driver information from outputs of at least a part of sensors of the plurality of sensors 30. Specifically, for example, if information indicating a tension level or a stress level of the driver is generated as the driver information, the signal processor 13 may perform signal processing on signals outputted from the at least the part of sensors, thereby generating information indicating a heart rate of the driver as intermediate date, and then may generate information indicating the tension level or the stress level of the driver based on the information indicating the heart rate, as the driver information. For example, if the information indicating the heart rate of the driver is generated as the driver information, the signal processor 13 may perform the signal processing on signals outputted from the at least the part of sensors, thereby generating the information indicating the heart rate of the driver as the driver information.

Various existing aspects can be applied to a method of generating the information indicating the heart rate, for example, from respective outputs of the piezoelectric sensors, the capacitive sensor, and the millimeter wave sensor, and thus, a detailed explanation of the method will be omitted. Various existing aspects can be also applied to a method of generating the information indicating the tension level or the stress level from the information indicating the heart rate, and thus, a detailed explanation of the method will be omitted. As described above, the driver information is not limited to the information indicating the tension level or the stress level and the information indicating the heart rate.

The sensor changer 12 is configured to determine one or a plurality of sensors that output signals to the signal processor 13, from the plurality of sensors 30, on the basis of at least one of the clothes and the physical features detected by the clothes-body build detector 11. In other words, the sensor changer 12 is configured to determine one or a plurality of sensors that output signals on the basis of which the driver information is generated by the signal processor 13, from the plurality of sensors 30.

Here, the outputs of the plurality of piezoelectric sensors arranged in the array on the seating surface of the seat are relatively significantly influenced by the physical features of the driver. It is because a position on the seating surface on which the weight of the driver is applied varies depending on the physical features of the driver (particularly, the size of the pelvis). The output of the capacitive sensor placed in the backrest of the seat is relatively significantly influenced by the clothes of the driver. It is because a distance between the driver and the capacitive sensor varies depending on the clothes of the driver. The output of the millimeter wave sensor is relatively significantly influenced by the physical features and the clothes of the driver. It is because the position of the millimeter wave sensor is fixed, even though the millimeter wave emitted from the millimeter wave sensor has relatively high directivity, and thus, a position to which the millimeter wave is applied varies depending on the physical features of the driver (e.g., sitting height). It is also because the millimeter wave is attenuated by moisture, and thus, if the driver wears clothes made of materials containing a relatively large amount of moisture, such as, for example, leather products, the attenuation of the millimeter wave caused by the clothes relatively increases.

The sensor changer 12 is configured to determine one or a plurality of sensors that output signals to the signal processor 13, from the plurality of sensors 30 arranged in the array on the seating surface of the seat, on the basis of the physical features detected by the clothes-body build detector 11. At this time, for example, the sensor changer 12 may estimate the size of the pelvis of the driver from the aforementioned detected physical features (e.g., sex, body build) and may specify the position on the seating surface of the seat on which the weight of the driver is applied on the basis of the estimated size of the pelvis, thereby determining one or a plurality of piezoelectric sensors that output signals to the signal processor 13. The existing technologies/techniques can be applied to a method of estimating the size of the pelvis from the physical features, and thus, a detailed explanation of the method will be omitted.

The sensor changer 12 is configured to determine whether or not the capacitive sensor placed in the backrest of the seat is set to be the sensor that outputs signals to the signal processor 13, on the basis of the clothes detected by the clothes-body build detector 11. In other words, the sensor changer 12 is configured to determine whether or not the capacitive sensor is set to be the sensor that outputs signals on the basis of which the driver information is generated by the signal processor 13. At this time, if the clothes detected by the clothes-body build detector 11 are relatively light cloths, such as, for example, T-shirts and blouses, the sensor changer 12 may determine the capacitive sensor to be the sensor that outputs signals to the signal processor 13. On the other hand, if the clothes detected by the clothes-body build detector 11 are relatively heavy cloths, such as, for example, coats and down jackets, the sensor changer 12 may determine the capacitive sensor not to be the sensor that outputs signals to the signal processor 13. The classification of whether the cloths are heavy or light may be determined, for example, in accordance with the performance and location of the capacitive sensor, the shape of the backrest of the seat, or the like, as occasion demands. How to detect the cloths when the driver wears layers of clothes may be also set as occasion demands, but under restrictions caused by the configuration of the embodiment in which the driver's clothes are detected from the images of the driver imaged by the camera 20, a top layer of clothes the driver wears may be detected as the driver's clothes, for convenience' sake.

The sensor changer 12 is configured to determine whether or not the millimeter wave sensor is set to be the sensor that outputs signals to the signal processor 13, on the basis of the clothes and the physical features detected by the clothes-body build detector 11. In other words, the sensor changer 12 is configured to determine whether or not the millimeter wave sensor is set to be the sensor that outputs signals on the basis of which the driver information is generated by the signal processor 13. At this time, if the clothes detected by the clothes-body build detector 11 are clothes made of materials rarely containing moisture, such as, for example, cotton products, the sensor changer 12 may determine the millimeter wave sensor to be the sensor that outputs signals to the signal processor 13. On the other hand, if the clothes detected by the clothes-body build detector 11 are clothes made of materials containing a relatively large amount of moisture, such as, for example, leather products, the sensor changer 12 may determine the millimeter wave sensor not to be the sensor that outputs signals to the signal processor 13. In addition, the sensor changer 12 may estimate the position to which the millimeter wave is applied, from the physical features detected by the clothes-body build detector 11 (e.g., sitting height), and may determine whether or not the millimeter wave sensor is set to be the sensor that outputs signals to the signal processor 13, in accordance with whether or not the estimated position is the chest of the driver (i.e., near the heart).

(Operation)

Next, operations of the sensing apparatus 100 configured in the above manner will be explained with reference to a flowchart in FIG. 3.

Figure 3:
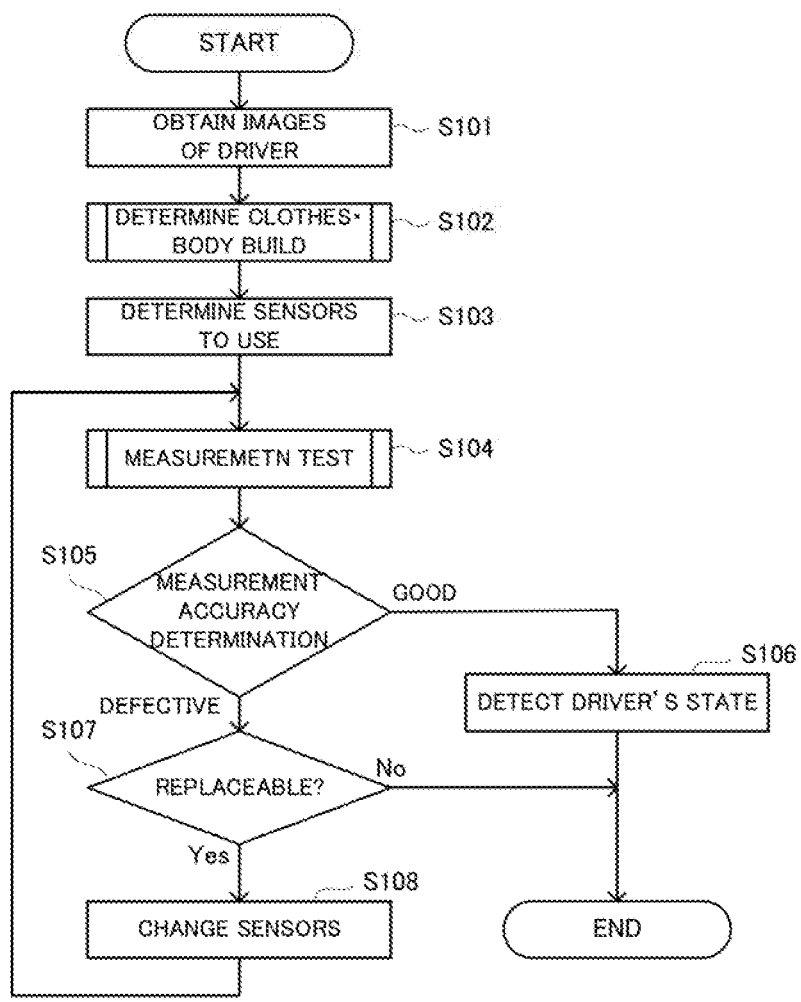
FIG. 3 is a flowchart illustrating a flow of operations of the sensing apparatus according to the embodiment.

In FIG. 3, the clothes-body build detector 11 of the arithmetic apparatus 10 obtains images of the driver imaged by the camera 20 (step S20). The clothes-body build detector 11 then determines at least one of the clothes and the physical features of the driver from the images obtained in the step S101 (step S102).

The sensor changer 12 then determines one or a plurality of sensors that output signals to the signal processor 13 (in other words, determines one or a plurality of sensors that output signals on the basis of which the driver information is generated by the signal processor 13), from the plurality of sensors 30, on the basis of a result of the step S102 (i.e., on the basis of at least one of the clothes and the physical features detected by the clothes-body build detector 11) (step S103).

In the step S103, the sensor changer 12 at least determines that a part of the plurality of piezoelectric sensors (refer to FIG. 2), which is a specific example of the plurality of sensors 30, are the one or plurality of sensors that output signals to the signal processor 13. In other words, in the step S103, the sensor changer 12 does not determine that all the plurality of sensors 30 are not the sensors that output signals to the signal processor 13.

The sensor changer 12 then performs a measurement test on the one or plurality of sensors that output signals to the signal processor 13 (step S104). The measurement test is a test for determining whether or not the signals outputted to the signal processor 13 are appropriate as the signals on the basis of which the driver information is generated. In the measurement test, for example, a signal level, a signal-to-noise ratio (S/N) or the like of the signals respectively outputted from the one or plurality of sensors that output signals to the signal processor 13 may be obtained. Alternatively, in the measurement test, the driver information generated from the outputs of the one or plurality of sensors by the signal processor 13 may be obtained as test data.

Even if the piezoelectric sensors that output signals to the signal processor 13 are determined from the plurality of piezoelectric sensors, which is a specific example of the plurality of sensors 30, on the basis of the physical features detected by the clothes-body build detector 11, if the driver is not correctly seated, such as, for example, if the driver changes the posture to take luggage on the back seat when stopping the vehicle 1, then, for example, the signal level, the S/N or the like of the signals outputted from the piezoelectric sensors is relatively small, and as a result, the accurate driver information cannot be generated from the outputs of the piezoelectric sensors.

Even if the capacitive sensor (refer to FIG. 2), which is a specific example of the sensor 30, is determined to be the sensor that outputs signals to the signal processor 13 on the basis of the clothes detected by the clothes-body build detector 11, if the driver is not in contact with the backrest of the seat, for example, because the driver drives in a leaning-forward posture, then, for example, the signal level, the S/N or the like of the signals outputted from the capacitive sensor is relatively small, and as a result, the accurate driver information cannot be generated from the output of the capacitive sensor.

Even if the millimeter wave sensor (refer to FIG. 2), which is a specific example of the sensor 30, is determined to be the sensor that outputs signals to the signal processor 13 on the basis of the clothes and the physical features detected by the clothes-body build detector 11, if the driver is not correctly seated or, for example, if cotton cloths contain moisture or water, such as rain water and sweat, then, for example, the signal level, the S/N or the like of the signals outputted from the millimeter wave sensor is relatively small, and as a result, the accurate driver information cannot be generated from the output of the millimeter wave sensor.

If at least a part of the signals outputted from the one or plurality of sensors determined in the step S103 (i.e., the one or plurality of sensors that outputs signals to the signal processor 13) is not appropriate as the signals on the basis of which the driver information is generated by the signal processor 13, then, measurement accuracy associated with the driver information generated by the signal processor 13 as the aforementioned test data is relatively highly likely insufficient (e.g., the measurement accuracy relatively highly likely does not satisfy a reference value).

Various existing aspects can be applied to a method of obtaining the measurement accuracy associated with the driver information. For example, if the information indicating the tension level as the driver information is generated on the basis of the information indicating the heart rate, the measurement accuracy may be obtained, for example, on the basis of errors of a plurality of information indicating the heart rate respectively generated from the outputs of the piezoelectric sensors, the capacitive sensor, and the millimeter wave sensor, or errors associated with a process in obtaining a heart rate (e.g., an average value) used when generating the information indicating the tension level from the plurality of information indicating the heart rate, or the like. Moreover, the reference value of the measurement accuracy may be set as an upper limit value of an acceptable error range based on a measurement error associated with the driver information, wherein the measurement error is obtained by experiments, experiences, or simulations, and is expected when the driver is measured in an ideal environment, for example, on the basis of nominal measurement errors of the sensors.

The sensor changer 12 performs measurement accuracy determination on the basis of a result of the step S104 (step S105). In the measurement accuracy determination, the sensor changer 12 may determine that it is "good" if, for example, the signal level, the S/N or the like of all the signals outputted from the one or plurality of sensors that output signals to the signal processor 13 meets criteria, or if the measurement accuracy associated with the driver information generated by the signal processor 13 as the aforementioned test data satisfies the reference value. On the other hand, the sensor changer 12 may determine that it is "defective" if, for example, the signal level, the S/N or the like of at least a part of the signals outputted from the one or plurality of sensors that output signals to the signal processor 13 does not meet the criteria, or if the measurement accuracy associated with the driver information generated by the signal processor 13 as the aforementioned test data does not satisfy the reference value.

In the step S105, if it is determined that it is "good" (the step S105: GOOD), the signal processor 13 generates the driver information from the outputs of the one or plurality of sensors that output signals to the signal processor 13 (step S106). On the other hand, in the step S105, if it is determined that it is "defectuve" (the step S105: DEFECTIVE, the sensor changer 12 determines whether or not it is substitutable (step S107). By the step S105, it is determined whether or not the outputs of the one or plurality of sensors determined in the step S103 are actually used for the signal processor 13 to generate the driver information.

For example, in the step S103, it is assumed that a part of the plurality of piezoelectric sensors, the capacitive sensor, and the millimeter wave sensor are determined to be the sensors that output signals to the signal processor 13. In this case, as a combination of the sensors (i.e., a selection method), there are seven combinations, which are (1) the piezoelectric sensors, the capacitive sensor, and the millimeter wave sensor, (2) the piezoelectric sensors and the capacitive sensor, (3) the piezoelectric sensors and the millimeter wave sensor, (4) the capacitive sensor and the millimeter wave sensor, (5) only the piezoelectric sensors, (6) only the capacitive sensor, and (7) only the millimeter wave sensor. If "defective" is determined in the step S105 for all the seven combinations, then, it is determined that it is "not substitutable" in the step S107. On the other hand, if there is a combination in which the step S104 (i.e., the measurement test) is not performed out of the seven combinations, then, it is determined that it is "substitutable" in the step S107.

In the step S107, if it is determined that it is substitutable (the step S107: Yes), the sensor changer 12 changes a combination of the sensors that are determined to be the sensors that output signals to the signal processor 13 in the step S103 (step S108). Then, the process after the step S104 is performed.

On the other hand, in the step S107, if it is determined that it is not substitutable (the step S107: No), the process illustrated in FIG. 3 is temporarily ended, in which case the driver information cannot be generated temporarily. Then, the step S101 is performed again after a lapse of a predetermined time (e.g., several ten milliseconds to several hundred milliseconds).

(Technical Effect)

On the sensing apparatus 100, one or a plurality of sensors that output signals to the signal processor 13 are determined from the plurality of sensors 30 on the basis of at least one of the clothes and the physical features of the driver, by the sensor changer 12. In other words, one or a plurality of sensors that output signals on the basis of which the driver information is generated by the signal processor 13 are determined from the plurality of sensors 30, by the sensor changer 12. As described above, on the sensing apparatus 100, at least one of the clothes and the physical features of the driver is considered, and the sensing apparatus 100 can thus suppress an influence of drivers' individual differences on the generation of the driver information.

On the sensing apparatus 100, after one or a plurality of sensors that output signals to the signal processor 13 are determined from the plurality of sensors 30 on the basis of at least one of the clothes and the physical features of the driver (i.e., after the step S103 in FIG. 3), the measurement test (i.e., the step S104 in FIG. 3) is performed. Thus, on the sensing apparatus 100, in the step S103 described above, accurate information about, e.g., the actual posture of the driver, the clothes the driver wears, or the like is not required. It is thus possible to make the step S102 relatively simple. As a result, it is possible to suppress a processing load caused by the process illustrated in FIG. 3.

If the measurement test is not performed, it is hard to appropriately determine one or a plurality of sensors that output signals on the basis of which the driver information is generated by the signal processor 13, unless another information, such as, for example, the driver's posture is detected in addition to at least one of the clothes and the physical features of the driver. It is because, as described above, the signals outputted from the plurality of sensors 30 may change due to the driver's posture. On the sensing apparatus 100, however, because the measurement test is performed, it is possible to determine one or a plurality of sensors that output signals on the basis of which the driver information is generated by the signal processor 13, on the basis of at least one of the clothes and the physical features of the driver.

By providing a plurality of types of sensors (which are the piezoelectric sensors, the capacitive sensor, and the millimeter wave sensor in the aforementioned embodiment) as the plurality of sensors 30, it is possible to reduce a situation in which the driver information cannot be generated. Moreover, by using the plurality of sensors 30 (which are, particularly in the aforementioned embodiment, the plurality of piezoelectric sensors), it is possible to reduce noise of the signals outputted from the sensors 30. For example, environmental noise appears in the signals outputted from the sensors 30 in many cases. Thus, if a difference between the output of one sensor 30 including relatively strong signals and the output of another sensor 30 including relatively weak signals or including no signals is obtained, then, it is possible to obtain signals with the environmental noise reduced.

For example, there is proposed a wearable sensor configured to measure the heart rate of a driver. The driver information can be generated on the basis of a measurement result of the wearable sensor, but the driver needs to wear the wearable sensor every time the driver gets on a vehicle, and some driver feel bothered by wearing the wearable sensor. If the driver does not wear the wearable sensor, the driver information cannot be generated. In contrast, on the sensing apparatus 100, the driver does not need to wear the wearable sensor. Thus, the driver does not feel bothered by generating the driver information by the sensing apparatus 100.

There is also proposed a technology/technique of estimating a driver's psychological state by detecting the driver's facial expression from face images of the driver. It is also known that the driver's psychological state hardly appears in the facial expression while driving. In contrast, on the sensing apparatus 100, a phenomenon caused by a living body is measured by the sensors 30. The phenomenon caused by the living body reflects the drive's psychological state more than the facial expression does. Thus, the sensing apparatus 100 can more appropriately generate information associated with the driver's psychological state, which is an example of the driver information, than when the driver's facial expression is detected.

Various aspects of embodiments of the present disclosure derived from the embodiment explained above will be explained hereinafter.

A sensing apparatus according to an aspect of embodiments of the present disclosure is a sensing apparatus configured to measure a target person without being attached to the target person, and configured to generate information associated with the target person from outputs of at least a part of sensors of a plurality of sensors that are different from each other in at least one of a sensor type and location, the sensing apparatus provided with: a specifier configured to specify at least one of clothes and physical features of the target person from images obtained by imaging the target person; and a determinator configured to determine one or a plurality of sensors, which are the at least the part of sensors, from the plurality of sensors, on the basis of the specified at least one of the clothes and the physical features.

In the embodiment, the "clothes-body build detector 11" corresponds to an example of the "specifier", and the "sensor changer 12" corresponds to an example of the "determinator".

The sensor that is not attached to (or worn by) the target person is influenced by at least one of the clothes and the physical features of the target person, due to at least one of the sensor type (in other words, a detection principle) and the location. It is because the sensor is not directly in contact with the skin of the target person, and thus, there is an influence by a substance or material that is between the sensor and the skin of the target person in the measurement of the target person. Alternatively, it is because a detection target section of the target person may deviate from a detectable range of the sensor depending on the physical features of the target person (e.g., sex, body build, etc.).

On the sensing apparatus, the one or plurality of sensors, whose outputs are used for the sensing apparatus to generate the information associated with the target person, are determined from the plurality of sensors on the basis of at least one of the clothes and the physical features of the target person, by the determinator. Thus, on the sensing apparatus, the one or plurality of sensors that are suited for at least one of the clothes and the physical features of the target person or that are restively less influenced by at least one of the clothes and the physical features of the target person, are determined to be the sensors that are used to generate the information associated with the target person.

An influence of the at least one of the clothes and the physical features of the target person on the outputs of the one or plurality of sensors determined in the above manner is expected to be relatively small. An influence of at least one of the clothes and the physical features of the target person (i.e., individual differences of target people) on the information associated with the target person generated from the outputs of the one or plurality of sensors is also expected to be relatively small. Therefore, according to the sensing apparatus, it is possible to generate the information associated with the target person in which an influence of the individual differences is suppressed.

In an aspect of the sensing apparatus, the determinator is configured to determine whether or not the determined one or plurality of sensors actually correspond to the at least the part of sensors, on the basis of outputs of the determined one or plurality of sensors.

While a process of generating the information associated with the target person is performed by the sensing apparatus, for example, the target person may consciously or unconsciously move. Alternatively, the clothes the target person wears may contain more moisture than moisture originally contained in the clothes, for example, due to rain waiter and sweat.

With reference to the actual outputs of the one or plurality of sensors determined on the basis of at least one of the clothes and the physical features of the target person, it is possible to relatively easily determine whether or not the outputs are influenced by an element (i.e., the aforementioned movement of the target person, the moisture, etc.) other than at least one of the clothes and the physical features specified from the images obtained by imaging the target person. In other words, it is possible to relatively easily determine (or select) the sensors that are not influenced by the element other than at least one of the clothes and the physical features, on the basis of the actual outputs.

Therefore, according to this aspect in which it is determined whether or not the determined one or plurality of sensors are the sensors whose outputs are actually used for the sensing apparatus to generate the information associated with the target person, on the basis of the actual outputs of the one or plurality of sensors determined on the basis of at least one of the clothes and the physical features of the target person, it is possible to generate the information associated with the target person, more appropriately.

In another aspect of the sensing apparatus, the plurality of sensors include a plurality of piezoelectric sensors arranged in an array on a seating surface of a seat on which the target person is seated, and the determinator is configured to determine one or a plurality of piezoelectric sensors corresponding to the at least the part of sensors, from the plurality of piezoelectric sensors, on the basis of the specified physical features.

According to this aspect, it is possible to determine the one or plurality of piezoelectric sensors used for the sensing apparatus to generate the information associated with the target person, relatively easily. It is because a position on the seating surface of the seat on which the weight of the target person is applied varies depending on the physical features of the target person.

In another aspect of the sensing apparatus, the plurality of sensors include a capacitive sensor placed in a backrest of a seat on which the target person is seated, and the determinator is configured to determine whether or not the capacitive sensor corresponds to the at least the part of sensors, on the basis of the specified clothes.

According to this aspect, it is possible to determine whether or not the capacitive sensor is used for the sensing apparatus to generate the information associated with the target person, relatively easily. It is because the capacitive sensor, in its detection principle, cannot accurately measure the target person unless a distance between the target person and the capacitive sensor is relatively small, but the distance varies depending on the clothes of the target person.

In another aspect of the sensing apparatus, the plurality of sensors include a millimeter wave sensor, and the determinator is configured to determine whether or not the millimeter wave sensor corresponds to the at least the part of sensors, on the basis of the specified clothes and the specified physical features.

A millimeter wave, by its nature, is attenuated by moisture. If the clothes of the driver are specified, it is known whether or not the clothes made of materials containing a relatively large amount of moisture (i.e., a substance that attenuates the millimeter wave), such as, for example, leather products, are between the millimeter wave sensor and the skin of the target person. It is thus possible to determine whether or not the millimeter wave sensor can be used to measure the target person, relatively easily. Moreover, the millimeter wave, by its nature, has relatively high directivity. If the physical features (e.g., body build) of the target person are specified, it is known whether or not the millimeter wave is applied to an appropriate position of the target person. It is thus possible to determine whether or not the millimeter sensor can be used to measure the target person, relatively easily. As described above, according to this aspect, it is possible to determine whether or not the millimeter wave sensor is to be used to measure the target person, relatively easily.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A sensing apparatus configured to generate information associated with a target person from outputs of at least one of a piezoelectric sensor, a capacitive sensor and a millimeter wave sensor, said sensing apparatus comprising:
    a processor that is configured to:
        specify at least one of clothes and a physical feature of the target person from an image obtained by imaging the target person;
        select sensor or sensors for measuring a heart rate of the target person from the piezoelectric sensor, the capacitive sensor and the millimeter wave sensor on the basis of the specified at least one of the clothes and the physical feature; and
        generate the information associated with the target person by generating information indicating the heart rate of the target person from outputs of the sensor or sensors selected from the piezoelectric sensor, the capacitive sensor and the millimeter wave sensor,
    wherein the processor is configured to select one or more piezoelectric sensors from a plurality of piezoelectric sensors arranged in an array on a seating surface of a seat, on which the target person is seated, as the sensor or sensors for measuring the heart rate of the target person, on the basis of the specified physical feature, wherein the plurality of piezoelectric sensors includes the piezoelectric sensor.

2. The sensing apparatus according to claim 1, wherein the processor is configured to determine whether or not the sensor or sensors selected from the piezoelectric sensor, the capacitive sensor and the millimeter wave sensor are used to measure the heart rate of the target person on the basis of outputs of the sensor or sensors selected from the piezoelectric sensor, the capacitive sensor and the millimeter wave sensor.

3. The sensing apparatus according to claim 1, wherein the capacitive sensor is placed in a backrest of a seat on which the target person is seated, and
said processor is configured to determine whether or not the capacitive sensor is used to measure the heart rate of the target person on the basis of the specified clothes.

4. The sensing apparatus according to claim 1, wherein said processor is configured to determine whether or not the millimeter wave sensor is used to measure the heart rate of the target person on the basis of the specified clothes and the specified physical features.

5. The sensing apparatus according to claim 2, wherein the capacitive sensor is placed in a backrest of a seat on which the target person is seated, and
said processor is configured to determine whether or not the capacitive sensor is used to measure the heart rate of the target person on the basis of the specified clothes.

6. The sensing apparatus according to claim 2, wherein said processor is configured to determine whether or not the millimeter wave sensor is used to measure the heart rate of the target person on the basis of the specified clothes and the specified physical features.

7. The sensing apparatus according to claim 3, wherein said processor is configured to determine whether or not the millimeter wave sensor is used to measure the heart rate of the target person on the basis of the specified clothes and the specified physical features.

* * * * *